United States Patent [19]

Brown

[11] Patent Number: 5,200,643

[45] Date of Patent: Apr. 6, 1993

[54] PARALLEL ELECTRIC POWER SUPPLIES WITH CURRENT SHARING AND REDUNDANCY

[75] Inventor: Stuart C. Brown, Lima, Ohio

[73] Assignee: Westinghouse Electric Corp., Pittsburgh, Pa.

[21] Appl. No.: 313,264

[22] Filed: Feb. 21, 1989

[51] Int. Cl.$^5$ ............................................. H02J 1/10
[52] U.S. Cl. ................................... 307/53; 307/58; 307/60; 307/82; 307/43
[58] Field of Search ..................... 307/43, 52, 87, 53, 307/82, 60, 58; 330/127, 199; 324/123 C; 363/65, 74; 323/275, 285, 272, 269

[56] References Cited

U.S. PATENT DOCUMENTS

| | | | |
|---|---|---|---|
| 3,428,909 | 2/1969 | Kam et al. | 330/140 |
| 4,074,146 | 2/1978 | Buonavita | 307/52 X |
| 4,328,429 | 5/1982 | Kublick | 307/87 X |
| 4,446,417 | 5/1984 | Fox et al. | 322/25 |
| 4,635,178 | 1/1987 | Greenhalgh | 363/65 |
| 4,677,535 | 6/1987 | Kawabata et al. | 307/87 X |
| 4,760,347 | 7/1988 | Li et al. | 330/127 |
| 4,924,170 | 5/1990 | Henze | 323/272 |

Primary Examiner—A. D. Pellinen
Assistant Examiner—Sharon D. Logan
Attorney, Agent, or Firm—R. P. Lenart

[57] ABSTRACT

An electric power system having power supplies connected in parallel to a common bus includes a voltage feedback and current feedback loop for each supply. A voltage feedback signal and a current feedback signal are combined with a reference signal to produce an error signal. The output voltage of each supply is controlled in response to its corresponding error signal, to achieve current sharing and redundancy without interconnections among the control circuits of the various supplies.

10 Claims, 3 Drawing Sheets

PARALLEL ELECTRIC POWER SUPPLIES WITH CURRENT SHARING AND REDUNDANCY

BACKGROUND OF THE INVENTION

This invention relates to electric power systems and, more particularly, to such systems having parallel-connected power supplies and methods of operating those supplies.

Often in fault-tolerant electric power systems, several (N) power supplies are connected in parallel for redundancy. Any one supply is capable of providing the entire load power. In DC systems, the supplies are usually connected to a common bus through diodes. This ensures isolation so that faulty supplies do not provide short circuit paths for active supplies. During normal operation, the supply with the slightly higher voltage becomes the active supply, providing all or most of the load current, while the others remain in an idle or standby mode. If the active supply should fail or its power source be cut off, the remaining supply with the highest voltage will become the new active supply.

While the above-described system provides redundancy, isolation, and independence in that there is no control interconnection, its efficiency is no better than that for a single supply system and possibly worse, since the idle supplies may still draw control power. The reliability of the overall system is high because of redundancy, but the reliability of the active supply is the same as that for a single supply since it is exposed to the full load voltage, current, and thermal stresses.

A better way to operate this type of system is to force load current sharing among the supplies. This increases efficiency since the resistive power losses ($I^2R$) are approximately 1/N of the losses of a single supply. Furthermore, power semiconductor device voltage drops, which contribute to power losses, are lower at 1/N of the full load current. Since each supply is exposed to less current and thermal stress, its reliability is higher than when carrying the entire load. This increases the overall system reliability above that of a system without load sharing, since overall system reliability is a function of the individual supply reliability. Another advantage is that heat removal may be easier since the losses are spread among the individual supplies.

Methods of accomplishing this improved system operation generally involve interconnecting the individual supply control circuits in a master-slave arrangement, or using a control circuit that automatically measures the current differences and adjusts the individual supplies to minimize them. In all cases, the lack of isolation and independence may make the system vulnerable to failure of an individual supply, current-sharing control circuit, or communication link, thereby defeating the purpose of redundancy. This may be especially true in applications that require supplies to be at some distance from each other, such as on aircraft or ships.

It is known that an increase in the output impedance of power supplies connected in parallel promotes current-sharing. This introduction of voltage regulation or droop makes the supply look slightly like a current source. With increasing droop, the supplies have more of a current source characteristic and current-sharing is more accurate. In the case of DC supplies, this impedance must be resistive. This, of course, is disadvantageous, resulting in increased losses and a fixed output droop characteristic at all load conditions.

It is therefore desirable to provide a power system comprised of N individual power supplies, parallel-connected to a common bus for redundancy, that can be operated in a current-sharing mode, gaining the advantages described above, without interconnection or communication among the supply control circuits, thereby gaining the additional advantages of total isolation and independence.

SUMMARY OF THE INVENTION

This invention provides a method of operating electric power supplies which are connected to a common bus in which a voltage feedback signal, representative of the output voltage of each of the power supplies, and an output current feedback signal, representative of the output current of each of the power supplies, are combined with a reference voltage signal to produce error signals that are used to control the output voltage of each of the power supplies. By controlling the gain applied to the current feedback signal, the desired operating characteristics of the system can be achieved.

This invention also encompasses electric power systems having parallel connected supplies which operate in accordance with the above-described method. The individual power supplies require no communication or interconnection among each other except at their output terminals, thereby keeping them isolated and independent and minimizing output voltage regulation.

BRIEF DESCRIPTION OF THE DRAWINGS

The invention will become more readily apparent from the following description of the preferred embodiment thereof, shown by way of example only, in the accompanying drawings wherein.

DESCRIPTION OF THE PREFERRED EMBODIMENT

Figure 1:
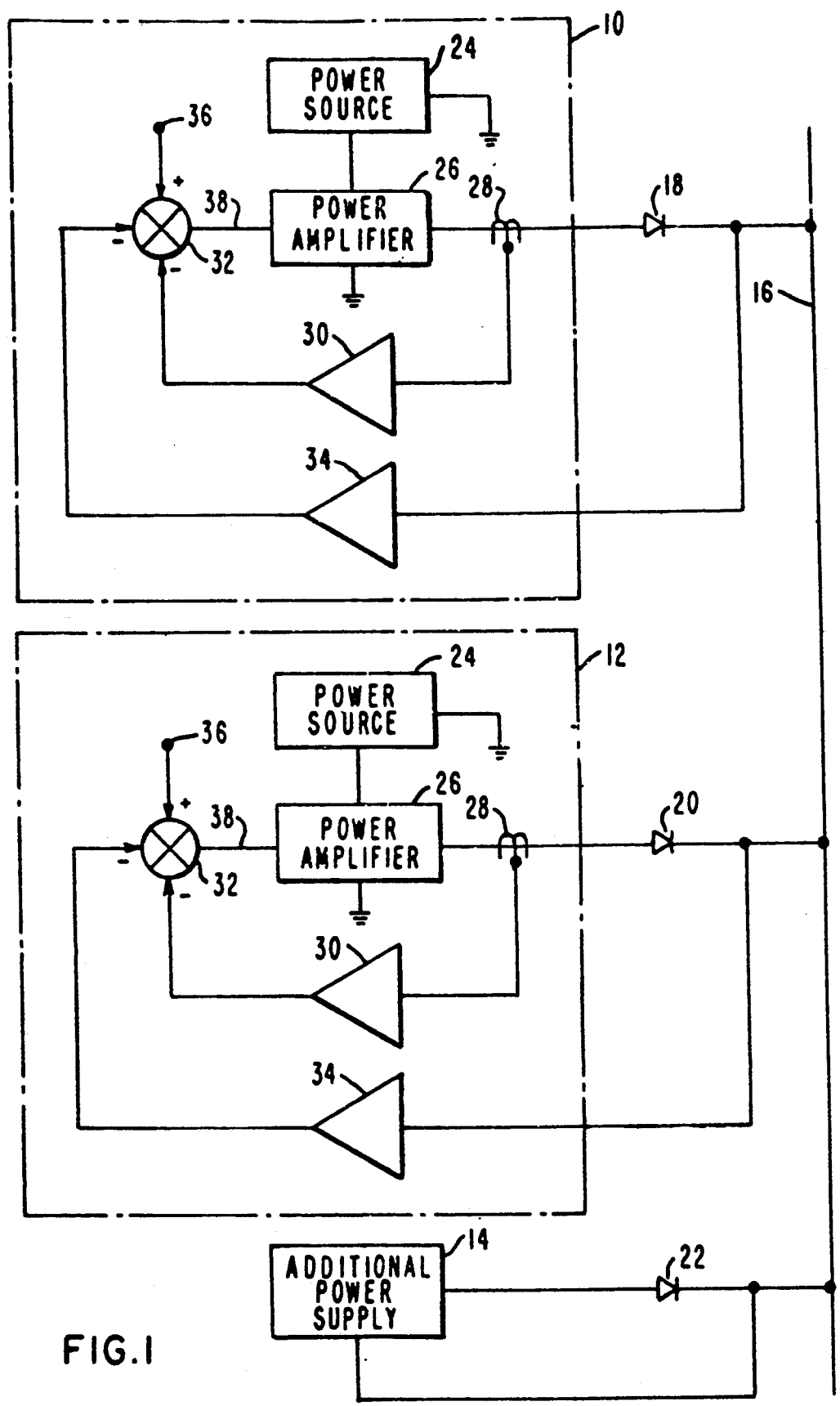
FIG. 1 is a block diagram of a parallel connected electric power system constructed in accordance with one embodiment of the present invention.

Referring to the drawings, FIG. 1 is a block diagram of a parallel connected DC electrical power system constructed in accordance with one embodiment of the present invention. In this embodiment, a plurality of power supplies 10, 12, 14 are electrically connected to a common bus 16 through diodes 18, 20, 22, respectively. Although three power supplies are illustrated in FIG. 1, it should be understood that any number of power supplies greater than one may be used in accordance with a system constructed and operated in accordance with this invention. Each of the power supplies of FIG. 1 includes a power source 24 which provides power to a power amplifier 26 that produces a DC output which is supplied to the common bus 16. The output current of each power amplifier is sensed by a transducer 28 to produce an output current feedback signal that is representative of the current delivered to the common bus. An amplifying circuit 30 applies a preselected gain to the feedback signal before it is fed to summation point 32. A voltage feedback loop monitors the output voltage of each power supply and produces a voltage feedback signal which is fed through amplifier 34 to summation point 32. A reference voltage signal is supplied to terminal 36 and is combined with the current and voltage feedback signals to produce an error signal on line 38. The output of the power amplifier 26 is controlled by this error signal to achieve the desired current sharing among the parallel connected supplies.

Series output resistance in the power supplies is emulated in this invention by feeding back an output current signal into the same summation point as the output voltage feedback signal. If there were no current feedback in the power supply voltage control loops, the output voltage would be a function of the reference voltage signal applied to terminal 36. As load current increases, the voltage would remain somewhat constant. If we now include the current feedback at some particular value of gain $G_{IFB}$, the voltage will droop, as load current increases. The result is the same as adding a series resistor to the power supply outputs, but without the power loss. The mechanism may be thought of as subtracting the current feedback signal $V_I$ from the reference signal $V_{REF}$, thereby reducing it and making the output voltage vary as a function of the load current. Increasing the gain of the current feedback signal results in a steeper slope of the output characteristic curve.

A further enhancement is provided by making the current feedback gain a function of the load current. This may be accomplished in discrete steps or as a continuous function. In this way, the output characteristic can be shaped, i.e., the slope controlled, to suit the needs of a specific application.

Figure 2:
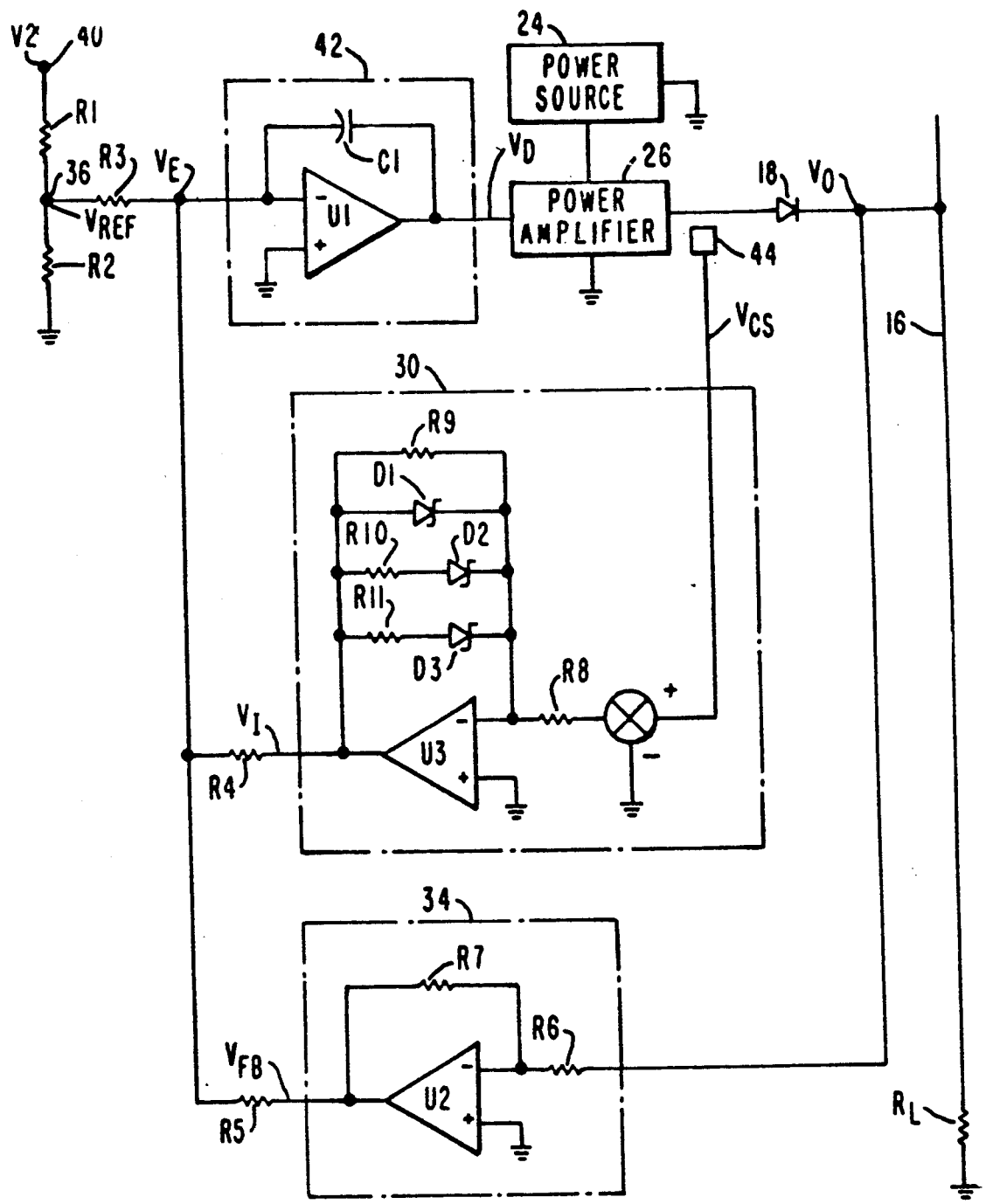
FIG. 2 is a schematic diagram of one of the channels of the power system of FIG. 1.

FIG. 2 is a schematic diagram of the power supply 10 in FIG. 1. By applying the control power voltage V2, which may be, for example 15 volts, to terminal 40, a reference voltage $V_{REF}$ is produced at terminal 36 and is determined by the values of resistors R1, R2. This reference signal is combined with a current feedback signal $V_I$ and a voltage feedback signal $V_{FB}$ through resistors R3, R4, R5 to produce an error signal $V_E$. An integrator 42 comprising operational amplifier U1 and capacitor C1, integrates the error signal to produce a demand signal $V_D$ which controls the output of the power amplifier 26.

The voltage feedback signal $V_{FB}$ is produced by monitoring the output voltage of the power supply and subjecting that voltage to a gain $G_{VFB}$ provided by an amplifying circuit 34 comprising operational amplifier U2 and resistors R6, R7. The circuit of block 34 attenuates and inverts the output voltage $V_O$, thereby providing the voltage feedback signal $V_{FB}$ as a negative signal.

A current sensor 44 which is assumed to be a noncontact device, such as a Hall effect sensor, monitors the output current of the power supply and produces a current feedback signal which is subjected to a current feedback signal gain $G_{IFB}$ by the circuit of block 30. The gain of the circuit of block 30 for any particular level of input voltage signal $V_{CS}$, is determined by the values of resistors R8, R9, R10, and R11, and the zener breakdown voltage values of zener diodes D1, D2, D3.

When the value of VCS and the circuit values of the components are such that the output of amplifier U3 is less than the zener voltage of any of the diodes D1, D2 or D3, then no zener branch will be conducting and the gain $G_{IFB}$ is determined by R8, R9 only. This is the case when all power supplies of the system are on-line and each power supply contributes 1/N of the full load power.

When the voltage $V_{CS}$ and the component values are such that the output of amplifier U3 is greater than the lowest zener voltage (say for diode D2), but less than the zener voltages of diodes D1 and D3, then the D2 branch will be conducting through resistor R10 and the gain $G_{IFB}$ will be determined by resistors R8, R9, R10. The gain will be lower than in the first case since resistors R9, R10 will be somewhat in parallel. This is the case when N−1 power supplies are on-line and each power supply contributes 1/(N-1) of the full load power.

When the voltage $V_{CS}$ and the component values are such that the amplifier U3 output is greater than the zener voltage of diode D3, but less than the zener voltage of diode D1, then the D3 circuit branch will be conducting through resistor R11 and the gain will be determined by resistors R8, R9, R10, and R11. The gain will be lower than in the second case since resistors R9, R10, and R11 will be somewhat in parallel. This is the case when N−2 power supplies are on-line and each power supply contributes 1/(N−2) of the full load power.

When the voltage $V_{CS}$ and the circuit component values are such that the output of amplifier U3 is equal to or slightly greater than the highest zener voltage (for diode D1), then the D1 circuit branch will be conducting through substantially zero resistance and the gain will be zero. This is the case for when only one supply is on-line feeding the load.

The circuit concept illustrated by block 30 in FIG. 2 can be extended so that there are N−2 zener/resistor branches in the U3 amplifier feedback circuit, shaping the current feedback characteristic to satisfy the requirements of the particular power system. The circuit of block 30 in FIG. 2 would be used in a system having four power supplies. Note that the current feedback signal $V_I$ is inverted, providing a negative current feedback signal.

Figure 3:
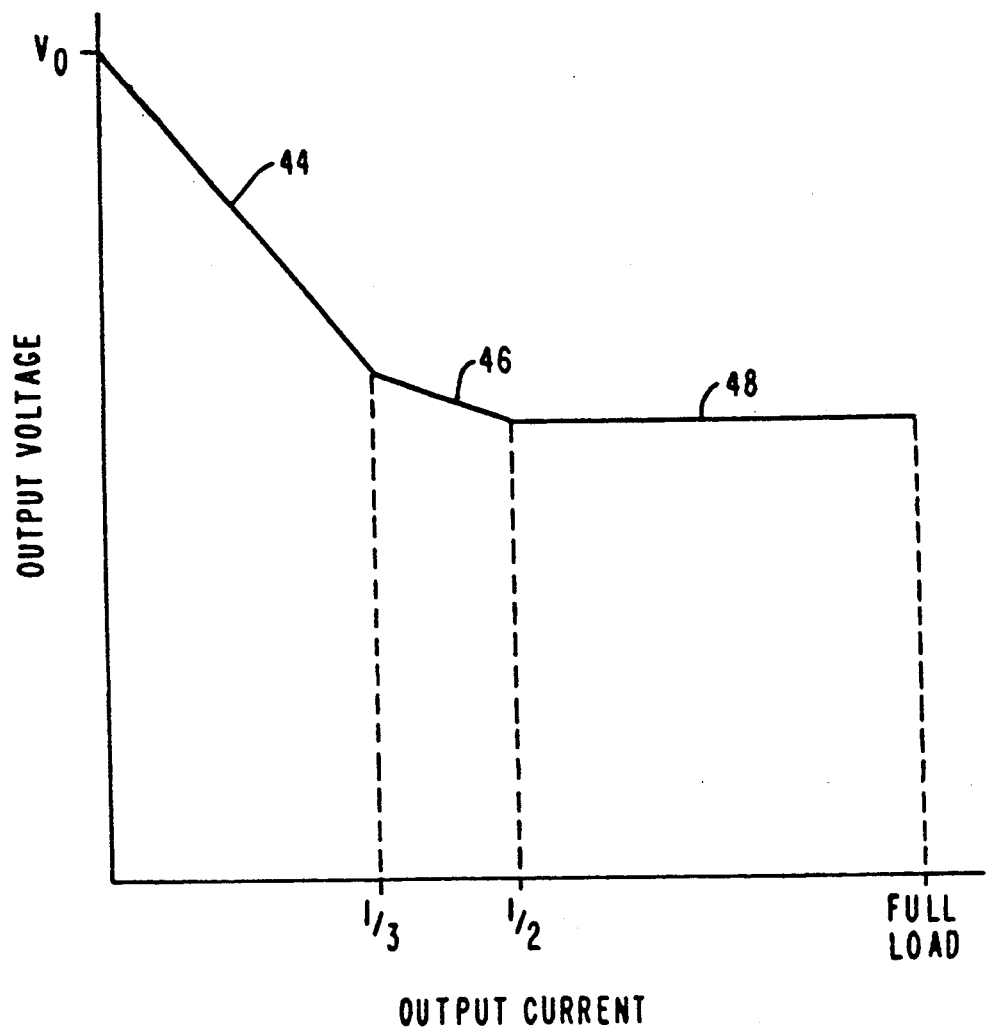
FIG. 3 is a curve which illustrates the operation of the power system of FIG. 1.

The circuit of FIG. 2 addresses the load-sharing problem in the following manner. It can be assumed that, under full load conditions, when all N of the supplies are active, only 1/N of the rated current is supplied to the load $R_L$ by each supply. Since the actual voltage droop is a function of individual supply current and output characteristic slopes, the output characteristic slope can be steepest, yielding the best sharing among all supplies. If one supply fails or is inactive, each of the remaining supplies provides a little more current, or 1/(N-1) of the total. The slope must now be less steep in order to minimize droop. In the extreme case, where only one active supply remains and no current sharing is required, the slope is zero. FIG. 3 shows the composite output characteristic curve for an individual supply in a system where N=3. When all three supplies are operating, each of the supplies operates in the portion of the characteristic curve labeled 44. When one of the supplies is removed, the remaining two supplies operate in the portion of the curve labeled 46. When two supplies are disabled, the remaining supply operates in the portion of the curve labeled 48. When load requirements are less than full load, each active supply may operate on a steeper part of the curve than at full load, but since the current is less, the voltage droop is less. Each power supply adjusts its output characteristic in accordance with its own current load without needing to know that the reason for its increased requirements is a failure of an adjacent supply. As discussed above, sharing can be traded off for voltage droop in accordance with the requirements of the specific application by proper selection of slopes and slope switch points.

The circuits and method of this invention are best applied to situations where some voltage regulation can be tolerated, since output voltage regulation is traded off against the accuracy of current sharing.

Although the present invention has been described in terms of what is at present believed to be its preferred embodiment, it will be apparent to those skilled in the art that various changes may be made without departing from the scope of the invention. For example, various well-known circuit designs may be used to perform the functions of blocks 24, 26, 30, 34 in FIG. 1. It is therefore intended that the appended claims cover such changes.

What is claimed is:

1. A method of operating a plurality of electric power supplies, each having an output connected to a common bus, said method comprising:

producing a plurality of voltage feedback signals, each of said voltage feedback signals being representative of voltage delivered by a corresponding one of a plurality of independent DC power supplies connected to a common bus;

producing a plurality of output current feedback signals, each of said output current feedback signals being representative of current delivered by a corresponding one of said power supplies to said common bus;

combining each of said voltage feedback signals with a corresponding voltage reference signals and a corresponding one of said output current feedback signals to produce a plurality of error signals, said error signals corresponding to each of said power supplies;

independently controlling the output voltage of each of said power supplies in response to a corresponding one of said error signals such that said output voltage decreases as the current delivered to said common bus increases for each of said power supplies; and applying a preselected gain to each of said current feedback signals before combining said current feedback signals with said voltage feedback signals and said voltage reference signal, wherein said gain decreases as the output current of each of said power supplies increases.

2. A method of operating a plurality of power supplies are recited in claim 1 wherein:

said gain decreases by predetermined increments as the output current of each of said power supplies increases.

3. A method of operating a plurality of electric power supplies, each having an output connected to a common bus, said method compiling:

producing a first voltage feedback signal, representative of voltage delivered by a first one of a plurality of independent DC power supplies to a common bus;

producing a first output current feedback signal, representative of current delivered by said first one of said power supplies to said common bus;

combining said first voltage feedback signal with a first voltage reference signal and said first output current feedback signal to produce a first error signal;

independently controlling the output voltage of said first one of said power supplies in response to said first error signal such that said output voltage of said first power supply decreases as said current delivered by said first power supply to said common bus increases;

producing a second voltage feedback signal, representative of voltage delivered by a second one of said independent power supplies to said common bus;

producing a second output current feedback signal, representative of current delivered by said second one of said power supplies to said common bus;

combining said second voltage feedback signal with a second voltage reference signal and said second output current feedback signal to produce a second error signal;

independently controlling the output voltage of said second one of said power supplies in response to said second error signal such that said output voltage of said second power supply decreases as said current delivered by said second power supply to said common bus increases;

applying a first preselected gain to said first current feedback signal before combining said first current feedback signal with said first voltage feedback signal and said first voltage reference signal; and applying a second preselected gain to said second current feedback signal before combining said second current feedback signal with said second voltage feedback signal and said second voltage reference signal.

4. A method of operating a plurality of power supplies as recited in claim 3, wherein:

said first preselected gain decreases as the output current of said first power supply increases; and said second preselected gain decreases as the output current of said second power supply increases.

5. A method of operating a plurality of power supplies as recited in claim 4, wherein:

said first preselected gain decreases by predetermined increments as the output current of said first power supply increases; and said second preselected gain decreases by said predetermined increments as the output current of said second power supply increases.

6. An electric power system comprising;

a plurality of independent DC electric power supplies, each having an output connected to a common bus;

means for producing a plurality of voltage feedback signals, each of said voltage feedback signals being representative of voltage delivered by a corresponding one of said power supplies to said coomon bus;

means for producing a plurality of output current feedback signals, each of said output current feedback signals being representative of current delivered by a corresponding one of said power supplies to said common bus;

means for combining each of said voltage feedback signals with a corresponding voltage reference siganl and a corresponding one of said output current feedback signals to produce a plurality of error signals, said error signals corresponding to each of said power supplies;

means for independently controlling the output voltage of each of said power supplies in response to a corresponding one of said error signals such that said output voltage decreases as the current delivered to said common bus increases for each of said power supplies; and means for applying a preselected gain to each of said current feedback signals before combining said current feedback signals with said voltage feedback signals and said voltage reference signal, wherein said gain decreases as the output current of each of said power supplies increases.

7. An electric power system as recited in claim 6, wherein:

said gain decreases by predetermined increments as the output current of each of said power supplies increases.

8. An electric power system comprising:

first and second independent DC electric power supplies, each connected to a common bus;

means for producing a first voltage feedback signal, representative of voltage delivered by a first one of said plurality of power supplies to said common bus;

means for producing a first output current feedback signal, representative of current delivered by said first one of said power supplies to said common bus;

means for combining said first voltage feedback signal with a first voltage reference signal and said first output current feedback signal to produce a first error signal;

means for independently controlling the output voltage of said first one of said power supplies in response to said first error signal that said output voltage of said first power supply decreases as said current delivered to said common bus by said first power supply increases;

means for producing a second voltage feedback signal, representative of voltage delivered by a second one of said plurality of power supplies to said common bus;

means for producing a second output current feedback signal, representative of current delivered by said second one of said power supplies to said common bus;

means for combining said second voltage feedback signal with a second voltage reference signal and said second output current feedback signal to produce a second error signal;

means for independently controlling the output voltage of said second one of said power supplies in response to said second error signal such that said output voltage of said second power supply decreases as said current delivered to said common bus by said second power supply increases;

means for applying a first preselected gain to said first current feedback before combining said first current feedback signal with said first voltage feedback signal sand said first voltage reference signal; and mean for applying a second preselected gain to said second current feedback signal before combining said second current feedback signal with said second voltage feedback signal and said second voltage reference signal.

9. An electric power system as recited in claim 8, wherein:

said first preselected gain decreases as the output current of said first power supply increases; and said second preselected gain decreases as the output current of said second power supply increases.

10. An electric power system as recited in claim 9, wherein:

said first preselected gain decreases by predetermined increments as the output current of first power supply increases; and said second preselected gain decreases by said predetermined increments as the output current of said second power supply increases.

* * * * *